United States Statutory Invention Registration [19]

[11] Reg. Number: H582

Tucker

[43] Published: Feb. 7, 1989

[54] BLENDS FOR MAKING SKIN PACKAGING FILMS

[76] Inventor: John H. Tucker, 1885 Howell, Beaumont, Tex. 77706

[21] Appl. No.: 26,852

[22] Filed: Mar. 17, 1987

[51] Int. Cl.[4] ..... C08K 3/26; C08J 37/00

[52] U.S. Cl. ..... 524/427; 524/517; 524/522; 525/207; 525/221

[58] Field of Search ..... 524/427, 522; 525/221

[56] References Cited

U.S. PATENT DOCUMENTS

| | | | |
|---|---|---|---|
| 3,365,520 | 1/1968 | Fontes et al. | 525/221 |
| 3,410,928 | 11/1968 | Baum | 525/221 |
| 3,682,767 | 8/1972 | Britton et al. | 525/221 |
| 3,709,957 | 1/1973 | Brebner | 525/221 |
| 3,900,635 | 8/1975 | Funderburk, Jr. et al. | 525/221 |
| 4,199,491 | 4/1980 | Inayoshi et al. | 260/31.2 R |
| 4,331,779 | 5/1982 | Park | 525/221 |
| 4,387,188 | 6/1983 | Statz | 524/522 |
| 4,420,580 | 12/1983 | Herman et al. | 524/424 |
| 4,423,164 | 12/1983 | Bar | 524/427 |

FOREIGN PATENT DOCUMENTS

| | | | |
|---|---|---|---|
| 171513 | 2/1986 | European Pat. Off. . | |
| 3324830 | 3/1984 | Fed. Rep. of Germany . | |
| 56-89517 | 7/1981 | Japan . | |
| 8234 | 1/1982 | Japan | 524/522 |
| 57-174327 | 10/1982 | Japan . | |
| 58-145745 | 8/1983 | Japan . | |
| 59-149942 | 8/1984 | Japan . | |
| 59-159841 | 9/1984 | Japan . | |
| 59-166544 | 9/1984 | Japan . | |

OTHER PUBLICATIONS

Notebook page by Tucker dated 3/3/86 titled "Melt Blend for Industrial Skin Pkg."

Misc. Shipment or Return Order dated 3-11-86.

Copy of Contract between Du Pont and Stone Container Corp. (and related papers).

*Primary Examiner*—John F. Terapane

*Assistant Examiner*—Susan Wolffe

[57] ABSTRACT

New blends of ethylene/carboxylic acid copolymers with high density polyethylene and inorganic fillers such as calcium carbonate are disclosed and are useful for making films for skin packaging applications.

20 Claims, No Drawings

---

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

BLENDS FOR MAKING SKIN PACKAGING FILMS

BACKGROUND OF THE INVENTION

This invention relates to blends of ethylene/carboxylic acid copolymers with high density polyethylene and inorganic fillers, which blends are useful for making films for skin packaging applications.

Skin packaging is a packaging method involving placing a product on a substrate material, such as paperboard, and draping heated plastic film over the product and substrate. A vacuum is then applied to draw the film down tightly to the board and around the product to make a secure and attractive package. One common application for skin packaging is industrial skin packaging used to protect products in transit. Products as divergent as computer tapes, lamps, service repair kits and table tops may be skin packaged instead of using die-cut corrugated, foam-in-place, foam peanuts and other stabilizing or dunnage materials. Skin packaging offers high throughputs and full visibility to check for tampering or missing components and also allows for quick identification, usually at significant cost reductions.

Low density polyethylene films are often used for skin packaging applications, but skin packaging films of ethylene/acid copolymers have been found to possess faster cycle times, better board adhesion, improved draw and better toughness than the low density polyethylene films. Oddly enough, one drawback of the ethylene/acid copolymer films is their relatively good optical properties since they more readily show the relatively unattractive packaging board used for the skin packaging of industrial items. Additionally, the industrial items themselves are often relatively unattractive. Thus, a method for affecting the optical properties of the ethylene/acid copolymer films, while not adversely affecting the desirable properties of such films, such as adhesion, was desired.

SUMMARY OF THE INVENTION

A method of modifying ethylene/acid copolymers by blending them with high density polyethylene and inorganic fillers has now been found which serves to degrade the optical properties of films made therefrom without degrading the adhesive and other desirable properties of such films. Surprisingly, this modification of the ethylene/acid copolymers leads to films which not only retain the adhesive properties of the unmodified copolymers, but in some cases leads to films with adhesive properties superior to that of the unmodified copolymers. Specifically, this invention relates to novel blends comprising:

(a) about 75 to 95.5% by weight of one or more ethylene/carboxylic acid copolymers;

(b) about 5 to 20% by weight of high density polyethylene; and (c) about 0.5 to 5% by weight of a particulate inorganic filler, and to films made therefrom.

DETAILED DESCRIPTION OF THE INVENTION

The ethylene/carboxylic acid copolymers which comprise the greatest part of the blends of this invention are copolymers of ethylene with an alpha, beta-ethylenically unsaturated carboxylic acid preferably having 3 to 8 carbon atoms. Examples of acid monomers include acrylic acid, methacrylic acid, ethacrylic acid, itaconic acid, maleic acid, fumaric acid, and monoesters of said dicarboxylic acids, such as methyl hydrogen fumarate, ethyl hydrogen fumarate and maleic anhydride. The concentration of acidic monomer in the copolymer is generally about 1 to 20 weight %, and preferably from about 3 to 15 weight %. Preferred copolymers are copolymers of ethylene with methacrylic acid or acrylic acid, or terpolymers of ethylene, maleic anhydride and esters of acrylic acid such as ethyl acrylate. The most preferred copolymer is a copolymer of ethylene with methacrylic acid, having an acid content of about 9 weight % and a melt index of about 1.5.

The particulate inorganic fillers useful in this invention are those fillers well known in the art for incorporation into films to improve handling characteristics. The preferred filler is calcium carbonate, but examples of other fillers which may be utilized include, but are not limited to, mica, aluminum silicate, magnesium silicate, and barium sulfate. Preferably, so as not to adversely affect the quality of the film, the filler is quite uniform in size; e.g., for the preferred calcium carbonate filler, a particle distribution would preferably range from about 0.3 to 50 microns, and more preferably from about 0.3 to 20 microns. Also, when it is desired to degrade the optical properties of the film (e.g., increase haze or reduce transparency), the refractive index of the filler preferably differs from that of the ethylene/acid copolymer and the high density polyethylene used in the blend.

The preferred high density polyethylene is a linear ethylene homopolymer of medium molecular weight distribution having a melt index of about 1.1.

A preferred composition comprises about 82 to 94% by weight of ethylene/acid copolymer, about 5 to 15% by weight high density polyethylene, and about 1 to 3 weight % inorganic filler.

The blends of this invention may be made and extruded into films by methods known in the art. The following examples illustrate blends and films of this invention.

EXAMPLES

A blend was made incorporating the following:

Component A: 88% by weight of ethylene/methacrylic acid copolymer having 9% methacrylic acid, a Melt Index of 1.5

Component B: 10% by weight of high density polyethylene hav:ng a Melt Index of 1.1

Component C: 2% by weight calcium carbonate, 3–5 micron average particle size and extruded into films 4 and 6 mil thick. Control films extruded from Component A alone and from low density polyethylene (LDPE) alone were also prepared. Properties for these films are presented in the following table. A description of the tests used follows the table.

TABLE

| | Film Properties | | | | | |
|---|---|---|---|---|---|---|
| | BLEND A | | BLEND A | | A LDPE | |
| Film | 4 mil | 4 mil | 6 mil | 6 mil | 5 mil | 5 mil |
| ADH,PP COR (g/in.) | | | | | | |
| MD | 729 | 681 | 873 | 736 | 771 | 811 |
| TD | 629 | 581 | 718 | 651 | 703 | 694 |
| ADH,UPUP COR (g/in.) | | | | | | |
| MD | 314 | 308 | 356 | 363 | 395 | 201 |
| TD | 333 | 296 | 364 | 349 | 411 | 218 |
| TEMPERATURE, F. | 190 | 230 | 195 | 198 | 190 | 230 |
| HEAT UP, sec. | 17 | 18 | 16.5 | 17.5 | 17.3 | 30 |

TABLE-continued

| Film | Film Properties BLEND A 4 mil | BLEND A 4 mil | BLEND A 6 mil | BLEND A 6 mil | A LDPE 5 mil | A LDPE 5 mil |
|---|---|---|---|---|---|---|
| HAZE | — | — | 71 | 1.5 | — | 12.8 |
| GLOSS | — | — | 4 | 90 | — | 18 |
| TRANSPARENCY | — | — | 0.2 | 43 | | 0.8 |
| ELMENDORF (g/mil) | | | | | | |
| MD | — | — | 209 | 224 | — | 84 |
| TD | — | — | 229 | 240 | — | 101 |
| SPENCER IMPACT (in-lbs/mil) | — | — | 3.1 | 4.3 | — | 2 |
| TENSILE (psi) | | | | | | |
| MD | — | — | 3959 | 4331 | — | 2814 |
| TD | — | — | 3999 | 4266 | — | 2947 |
| ELONGATION (%) | | | | | | |
| MD | — | — | 512 | 536 | — | 540 |
| TD | — | — | 502 | 574 | — | 530 |

ADH,PP COR - Adhesion to primed printed corrugated board
ADH,UPUP COR - Adhesion to unprimed unprinted corrugated board
TEMPERATURE - Amount of heat retained in the film as it contacts the board to activate the primer or adhesive on the board for good adhesion
HEAT UP - The optimum amount of time required to soften the film for skin packaging, i.e., the amount of time required to "double drape" the film.
HAZE - ASTM D1003-61
GLOSS - ASTM D2457-70
TRANSPARENCY - ASTM D1746-70
ELMENDORF - ASTM D1922-67
SPENCER IMPACT - ASTM D3420-85
TENSILE - ASTM D822-83
ELONGATION - ASTM D822-83
MELT INDEX - (Referred to elsewhere in this specification) - D1238

The data in the table indicate that the films prepared from the blends of this invention possessed superior physical properties and better adhesion to unprimed corrugated board than the film of low density polyethylene. The films according to this invention, when compared to films prepared from ethylene/acid copolymer alone (Component A), also possessed a slight increase in adhesion to primed corrugated board, a reduction in film heat-up time, and no adverse reduction in film physical propeties.

What is claimed is:

1. A blend useful for extruding into skin packaging films comprising:

(a) about 75 to about 95.5% by weight of one or more ethylene/carboxylic acid copolymers;

(b) about 5 to about 20% by weight of high density polyethylene; and (c) about 0.5 to 5% by weight of one or more particulate inorganic fillers.

2. A blend according to claim 1 where said ethylene/-carboxylic acid copolymer is a copolymer of ethylene with methacrylic acid or acrylic acid having an acid content of about 3 to 15 weight %.

3. A blend according to claim 1 where said ethylene/-carboxylic acid copolymer is a copolymer of ethylene with about 9 weight % methacrylic acid.

4. A blend according to claim 1 where said inorganic filler is calcium carbonate.

5. A blend according to claim 4 where said inorganic calcium carbonate has an average particle size of about 3 to 5 microns.

6. A blend according to claim 1 where said high density polyethylene has a melt index of about 1.1.

7. A blend according to claim 1 which comprises about 82 to 94% by weight of ethylene/acid copolymer, about 5 to 15% by weight high density polyethylene, and about 1 to 3% by weight inorganic filler.

8. A blend according to claim 1 where said ethylene/-carboxylic acid copolymer is a copolymer of ethylene with methacrylic acid or acrylic acid having an acid content of about 3 to 15 weight %, said inorganic filler is calcium carbonate, and said high density polyethylene has a melt index of about 1.1.

9. A blend according to claim 8 which comprises about 82 to 94% by weight of said high density polyethylene, and about 1 to 3% by weight of said calcium carbonate.

10. A blend according to claim 9 which comprises about 88% by weight of ethylene/acid copolymer, about 10% by weight of high density polyethylene, and about 2% by weight of calcium carbonate.

11. A film made from the blend of claim 1.
12. A film made from the blend of claim 2.
13. A film made from the blend of claim 3.
14. A film made from the blend of claim 4.
15. A film made from the blend of claim 5.
16. A film made from the blend of claim 6.
17. A film made from the blend of claim 7.
18. A film made from the blend of claim 8.
19. A film made from the blend of claim 9.
20. A film made from the blend of claim 10.

* * * * *